United States Patent [19]

Hunyar

[11] 3,899,832
[45] Aug. 19, 1975

[54] PHONOGRAPH RECORD PROFILE TRACER

[75] Inventor: Csaba K. Hunyar, Sunland, Calif.

[73] Assignee: United Artists Music and Records Group, Inc., Los Angeles, Calif.

[22] Filed: Mar. 11, 1974

[21] Appl. No.: 450,049

[52] U.S. Cl............................. 33/174 P; 33/174 L
[51] Int. Cl. ........................................... G01b 5/20
[58] Field of Search........... 33/174 P, 174 Q, 143 L, 33/147 L, 174 PA, 174 L

[56] References Cited
UNITED STATES PATENTS
3,750,294   8/1973   Belke ............................... 33/147 L Primary Examiner—Richard E. Aegerter
Assistant Examiner—Willis Little
Attorney, Agent, or Firm—William W. Haefliger

[57] ABSTRACT

Phonograph record profile testing apparatus comprises a. a turntable substantially undersized relative to the record overall diameter for supporting the record with opposite sides thereof exposed, and b. a pair of transducers including sensors at locations spaced to receive the turntable supported record therebetween, to simultaneously engage opposite sides of the record and to produce electrical signals which vary in response to movement relative to the sensors of record surface portions engaged by the sensors and generally normal to the plane of the record. The sensors may have record engagement tips at locations spaced apart along a direction which is generally normal to the plane; arm structure carries the transducers at such location; and means is provided to displace that structure to carry the tips generally radially across the record.

6 Claims, 2 Drawing Figures

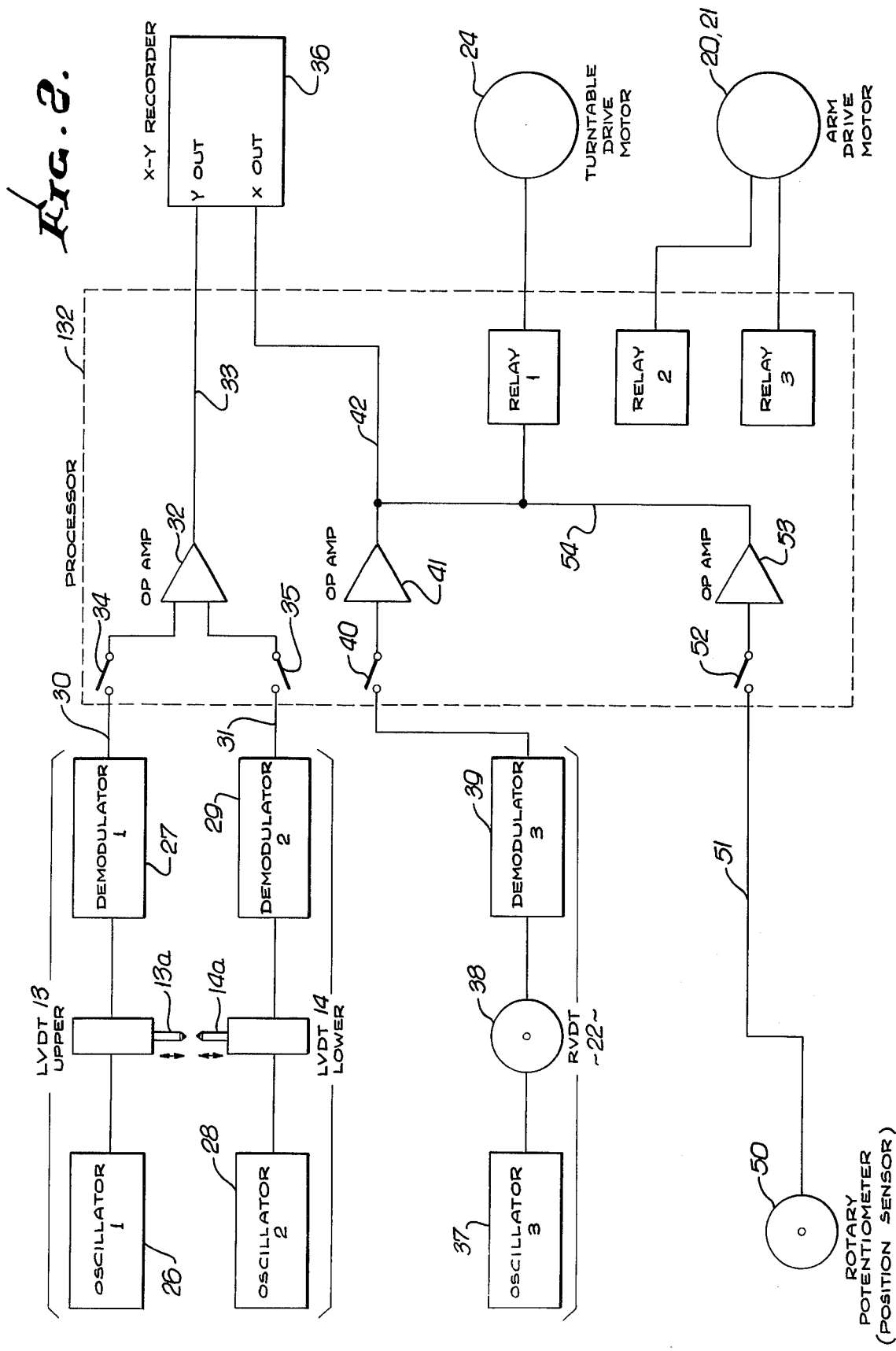

PHONOGRAPH RECORD PROFILE TRACER

BACKGROUND OF THE INVENTION

This invention relates generally to profile testing of phonograph records, and more particularly concerns an unusually advantageous apparatus for quickly and accurately tracing and recording upper and lower surface profiles, radially; thickness variations, radially; and profile and thickness variations circumferentially.

Phonograph records are pressed in such a form that there are certain profile requirements as well as thickness specifications along the radius of the record. In some profiles, for instance, the center label is thicker, the music area is thinner, and again, around the edge there is a thicker rim. Also, the thickness can vary along the music area for thicker or thinner outside sections (positive or negative taper). This is called cross-sectional radial profile of the record. The record has also to maintain certain specifications for thickness uniformity on any circumference and also for warp over the full surface. No way was known, prior to the present invention, to achieve rapid and accurate profile and thickness tracing and recording, in the unusually advantageous manner as will appear.

SUMMARY OF THE INVENTION

It is a major object of the invention to provide equipment capable of meeting the above described needs. Basically, the apparatus comprises:

a. a turntable of a diameter substantially less than the record overall diameter for supporting the record with opposite sides thereof exposed, and b. a pair of transducers including sensors at locations spaced to receive the turntable supported record therebetween, to simultaneously engage opposite sides of the record and to produce electrical signals which vary in response to movement relative to the sensors of record surface portions engaged by the sensors and generally normal to the plane of the record.

As will appear, the sensors have record surface engaging tips at locations spaced apart along a direction generally normal to the plane of the record; arm structure is provided to carry the transducers at locations as described, there being means to displace the arm structure to carry the sensor tips generally radially across the record; the transducers may comprise linear differential transformers whose outputs are selectively electrically coupled to one input of an X-Y recorder; the arm structure may be rotated, and a rotary variable differential transformer may be coupled to the arm structure to provide an output signal corresponding to radial positions of the sensor tips relative to the record, the RVDT output electrically connected with another input of the X-Y recorder; and a rotary position sensor may be coupled to the turntable drive to produce an output signal corresponding to the circumferential position of the record. As a result, five different surface profile and thickness variation modes may be read out of the equipment, as will appear.

These and other objects and advantages of the invention, as well as the details of an illustrative embodiment, will be more fully understood from the following description and drawings, in which:

DRAWING DESCRIPTION

FIG. 2 is a circuitry block diagram of the apparatus shown in FIG. 1.

DETAILED DESCRIPTION

Figure 1:
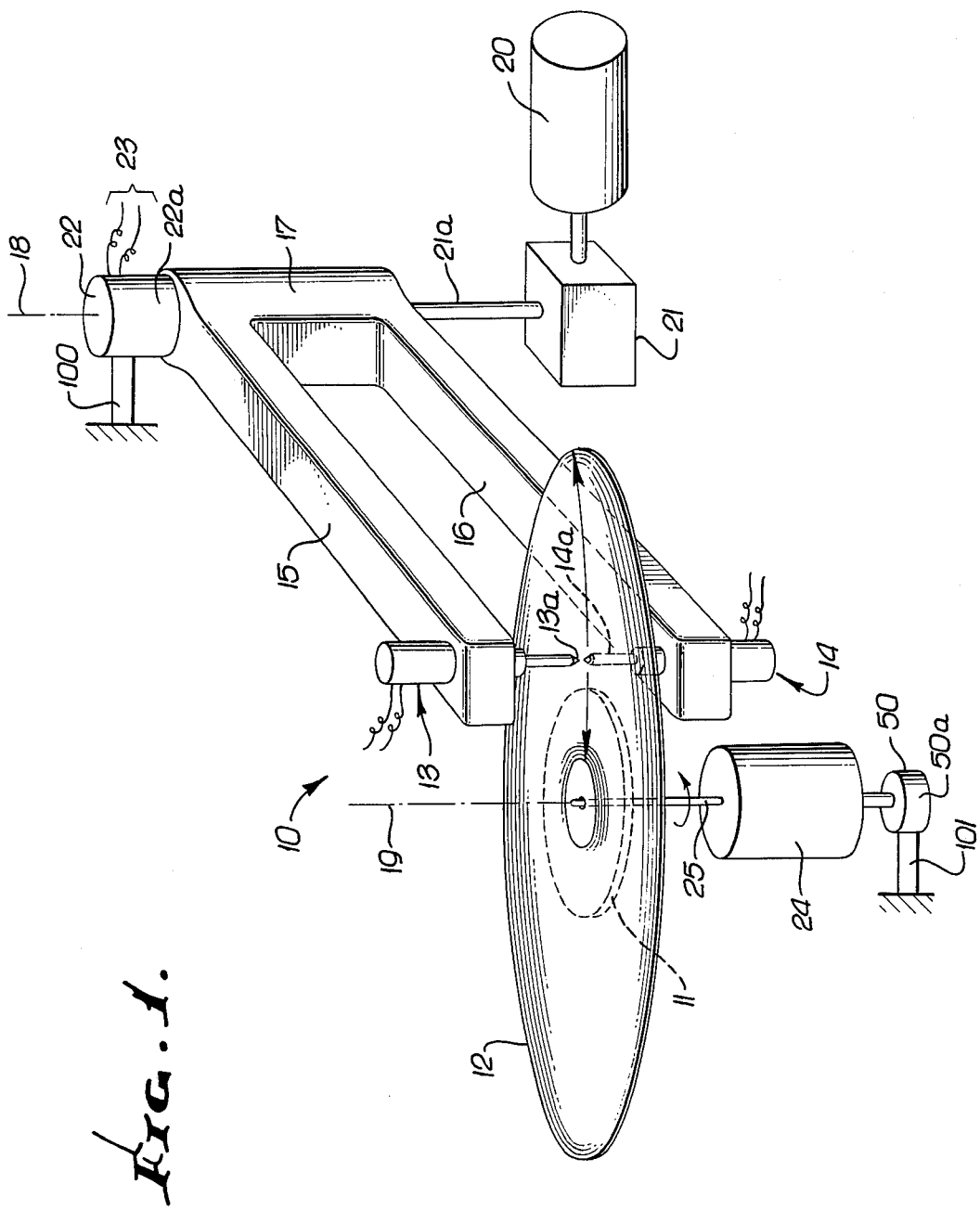
FIG. 1 is a perspective showing of apparatus incorporating the invention.

In the drawings, the phonograph record profile testing apparatus 10 includes a slowly rotating turntable 11 of a diameter substantially less than that of the overall diameter of the supported record 12 so that the grooved opposite sides of the record remain exposed.

Two transducers 13 and 14 including sensors 13a and 14a are respectively located at opposite sides of a plane defined by the record, i.e., are aligned and spaced apart to receive the record therebetween, and to simultaneously engage opposite sides of the record. The sensors have record surface engaging tips which are spaced apart along a direction which is generally normal to the plane of the record. The sensors may be linearly movable along such direction, and the transducers may include springs which yieldably urge the sensors linearly oppositely into engagement with the record surfaces. In this regard, each transducer may comprise a so-called LVDT (linear variable differential transformer). Examples of such device are described in detail in Technical Bulletin 7001, Schaevitz Engineering, Pennsauken, New Jersey.

Structure 100 is provided to carry the transducers, as shown, and may with unusual advantage comprise spaced parallel arms 15 and 16 straddling the record 12. A cross-piece 17 integrally joins the two arms and the structure is rotatable about an axis 18, parallel to the turntable rotation axis 19, by a suitable drive including synchronous motor 20 and reduction gear 21. The latter's output shaft 21a is connected with cross-piece 17. Accordingly, as the record rotates, the sensors 13a and 14a radially traverse the record. A rotary variable differential transformer (RVDT) 22 is operatively coupled to the cross-piece 17 to produce an output signal at 23 corresponding to radial positions of the transducer tips relative to the axis 19 of the record. Linear movement of the sensor tips, of course, measures changes in record section thickness, i.e., the radial profile of the record. Case 22a attaches to fixed or reference structure 100.

Means to rotate the turntable 11 may include a synchronous motor and reduction gear unit 24 typically rotating the table via shaft 25 at between 1 and 10 RPM. A rotary potentiometer 50 is coupled to drive 24 to produce an output corresponding to the circumferential position of the record. Case 50a attached to reference structure 101.

Turning to FIG. 2, the upper and lower LVDTs 13 and 14 each include oscillators and demodulators, indicated at 26, 27, 28 and 29, and their output signals at 30 and 31 are fed to a signal processor 132. The latter may include an operational amplifier 32 whose output is fed via 33 to the Y input of an X-Y recorder 36. Either or both of the LVDTs may be connected to the amplifier via selective closing of switches 34 and 35. The RVDT 22 also includes an oscillator 37, rotary sensor element 38, and demodulator 39. Examples of such devices are also described in Technical Bulletin 7001, Schaevitz Engineering, Pennsauken, New Jersey. The output signal may be fed via closable switch 40 to operational amplifier 41 in the processor. The output of amplifier 41 is fed at 42 to the X input of the recorder 36.

The output of rotary position sensor 50 is fed at 51 and via switch 52 to operational amplifier 53 in processor 32, and the amplifier output is also fed, as via lead 54 and lead 42 to the X-input of the recorder 36.

OPERATION DESCRIPTION

After placing and securing the record on the turntable, the arms are moved in such a position that the record is separating the two LVDT sensors 13a and 14a. Five different modes can be selected by the four position switches in the processor:

Mode 1: Tracing the upper surface of the record radially, indicating warp. Switches 34 and 40 closed, switches 35 and 52 open.

Mode 2: Tracing the lower surface of the record radially, indicating warp. Switches 35 and 40 closed and switches 34 and 52 open.

Mode 3: Tracing the thickness of the record radially, describing profile. Switches 34 and 35 and 40 closed, and switch 52 open.

Mode 4: Tracing the upper surface of the record circumferentially indicating warp. Switches 34 and 52 closed and switches 35 and 40 open.

Mode 5: Tracing the thickness variation circumference on any given diameter indicating thickness uniformity on that diamter. Switches 34, 35 and 52 closed and switch 40 open.

In modes 1, 2, and 3 the turntable is not rotating; only the arm drive moves inwardly or outwardly tracing the radius. In modes 4 and 5 the LVDT sensors are positioned on any radius desired, the arm drive is not operating, and by rotating the record using the turntable drive, the circumference is scanned for warp or thickness variations. The operation may be supplemented by inner and outer limit switches preventing the inner or outer over-run of drive, and turntable starter circuit which will start the turntable at a given position only, and after completing one full revolution will stop the turntable motor again. The arm may have a manual clutch so that the arm can be moved inward or outward manually or by the arm drive motor.

Before operation, the two LVDT sensors are actuated without a record between them and the X–Y recorder is zeroed out. Then a known thickness object, for instance, a feeler gauge, is inserted between the two sensors and the X–Y recorder is calibrated. This is done in mode 3 for thickness. For the absolute measurements for mode 1, 2, and 4, the same calibration process is used by stabilizing of the lower LVDT, moving only the upper one.

In place of the X–Y recorder, one could use a chart recorder since the arm drive motor and turntable drive motor both are synchronous motors that can be synchronized with the paper drive on the chart recorder. In this way, the chart recorder will give the radial position in the modes 1, 2 and 3 and the angular position in modes 4 and 5 as time, but the time can be related in a one-to-one correspondence to the actual radial or angular positions.

I claim:

1. In combination with a phonograph record, record profile testing apparatus comprising
   a. a turntable substantially undersized relative to the record overall diameter for supporting the record with opposite sides thereof exposed,
   b. a pair of transducers including sensors at locations spaced to receive the turntable supported record therebetween, to simultaneously engage opposite sides of the record and to produce electrical signals which vary in response to movement relative to the sensors of record surface portions engaged by the sensors and generally normal to the plane of the record, the sensors having record engaging tips at locations spaced apart along a direction which is generally normal to said plane, and
   c. structure carrying said transducers at said locations, and means to displace said structure to carry the transducer tips generally radially across the record.

2. The apparatus of claim 1 wherein said structure includes spaced arms to receive the record therebetween, said means including a drive coupled to said structure to rotate said arms about an axis generally parallel to an axis defined by said turntable.

3. The apparatus of claim 1 wherein the transducers comprise linear variable differential transformers.

4. The apparatus of claim 2 including a rotary variable differential transformer coupled to said structure to produce an output signal corresponding to the radial position of the transducer tips relative to the record.

5. The apparatus of claim 1 including means to rotate said turntable, and a rotary position sensor means coupled to said turntable rotating means to produce an output signal corresponding to the circumferential position of the record.

6. The apparatus of claim 4 including means to record a transducer output version as a function of the output of the rotary variable differential transformer.

* * * * *